(12) United States Patent  
Dixon et al.

(10) Patent No.: US 9,324,014 B1  
(45) Date of Patent: Apr. 26, 2016

(54) AUTOMATED USER CONTENT PROCESSING FOR AUGMENTED REALITY

(71) Applicant: MixxMedia, LLC, Upper Marlboro, MD (US)

(72) Inventors: Craig Dixon, Upper Marlboro, MD (US); Shartoyea Scott Dixon, Upper Marlboro, MD (US); Vijay Kumar, Andhra Pradesh (IN)

(73) Assignee: MixxMedia, LLC, Upper Marlboro, MD (US)

( * ) Notice: Subject to any disclaimer, the term of this patent is extended or adjusted under 35 U.S.C. 154(b) by 0 days.

(21) Appl. No.: 14/641,091

(22) Filed: Mar. 6, 2015

Related U.S. Application Data

(60) Provisional application No. 62/045,155, filed on Sep. 3, 2014.

(51) Int. Cl.
| | |
|---|---|
| *H04N 1/40* | (2006.01) |
| *G06K 15/02* | (2006.01) |
| *G06K 15/00* | (2006.01) |
| *G06F 3/12* | (2006.01) |

(52) U.S. Cl.
CPC .......... *G06K 15/1889* (2013.01); *G06F 3/1238* (2013.01); *G06F 3/1243* (2013.01); *G06K 15/1822* (2013.01); *G06K 15/4095* (2013.01)

(58) Field of Classification Search
None
See application file for complete search history.

(56) References Cited

U.S. PATENT DOCUMENTS

| | | | | |
|---|---|---|---|---|
| 8,203,744 | B2 * | 6/2012 | Oba | G06F 17/30241 358/1.15 |
| 8,325,398 | B2 * | 12/2012 | Satomi | G11B 27/034 358/1.15 |
| 8,422,794 | B2 * | 4/2013 | Ptucha | G06K 9/6202 345/581 |
| 8,542,906 | B1 | 9/2013 | Persson et al. | |
| 8,588,548 | B2 | 11/2013 | Krolczyk et al. | |
| 8,666,169 | B2 | 3/2014 | Tang et al. | |
| 2001/0039552 | A1 * | 11/2001 | Killi | G06F 9/4446 715/234 |
| 2012/0027294 | A1 | 2/2012 | Krolczyk et al. | |
| 2013/0207373 | A1 | 8/2013 | Lucas-Woodley et al. | |
| 2014/0201126 | A1 * | 7/2014 | Zadeh | G06K 9/627 706/52 |
| 2015/0112785 | A1 * | 4/2015 | Sharan | G06Q 30/0224 705/14.23 |

* cited by examiner

*Primary Examiner* — Steven Kau  
(74) *Attorney, Agent, or Firm* — Fish & Richardson P.C.

(57) ABSTRACT

A method and system for augmenting images in physical documents with additional digital media content is described. A user device can scan the images and automatically retrieve and render the associated digital media content. Combinations of photographs, audio, maps and videos may be generated to allow users to create a cohesive interactive story. Some aspects of the disclosure involve gathering content to generate a physical document with augmented images, analyzing images for suitability to be augmented, linking images with digital media content, and generating augmented images from digital media content such as digital images, videos, and maps.

19 Claims, 13 Drawing Sheets

AUTOMATED USER CONTENT PROCESSING FOR AUGMENTED REALITY

CROSS REFERENCE TO RELATED APPLICATION

This application claims priority from U.S. Provisional Application No. 62/045,155, filed Sep. 3, 2014 and titled "Automate User Content Processing for Augment Reality," which is incorporated by reference herein in its entirety.

FIELD

This disclosure relates generally to associating an image with interactive content on a user device.

BACKGROUND

User devices are often used to capture important events in a user's life using still pictures (e.g., photographs) or moving pictures (e.g., video). A user may further publish photographs in conventional, physical documents, such as photographs, photobooks, calendars, and postcards. However, additional content that can be captured by the user devices, such as audio and video, may not be rendered by conventional, physical documents.

SUMMARY

The present disclosure relates to a process for augmenting images in physical documents, e.g., photographs, photobooks, calendars, and postcards, with additional digital media content such digital audio, video, graphics or global positioning system (GPS) data so that a user device can scan the images and automatically retrieve and render the associated digital media content. The process may allow combination of photographs, audio, maps and videos to allow users to create a cohesive interactive story. Some aspects of the disclosure involve gathering content to generate a physical document with augmented images, analyzing images for suitability to be augmented, linking images with digital media content, and generating augmented images from digital media content such as digital images, videos, and maps.

In some implementations, a computer-implemented method of generating a physical document having at least one image providing access to digital media content is described. The method includes receiving a digital media file at one or more processors, obtaining a digital image at the one or more processors, receiving, at the one or more processors, a request to link the digital image to the digital media file, and processing, at the one or more processors, the digital image to generate a score. The score is based at least in part on a uniqueness of the digital image. The method further includes, responsive to determining that the score for the digital image satisfies a threshold, associating, at the one or more processors, the digital image to the digital media file such that a representation of the digital image provides access to the digital media file. The method further includes generating data representing a physical document that includes a representation of the digital image, and providing the data representing the physical document to a publisher such that the publisher prints one or more copies of the physical document.

In some implementations, a non-transitory computer-readable storage medium including instructions, which, when executed by one or more computers, cause the one or more computers to perform actions is described. These actions include receiving a digital media file, obtaining a digital image, receiving a request to link the digital image to the digital media file, and processing the digital image to generate a score. The score is based at least in part on a uniqueness of the digital image. The actions further include responsive to determining that the score for the digital image satisfies a threshold, associating the digital image to the digital media file such that a representation of the digital image provides access to the digital media file, generating data representing a physical document that includes a representation of the digital image, and providing the data representing the physical document to a publisher such that the publisher prints one or more copies of the physical document.

In some implementations, a system including one or more computers and one or more storage devices storing instructions that are operable and when executed by one or more computers, cause the one or more computers to perform actions is described. These actions include receiving a digital media file, obtaining a digital image, receiving a request to link the digital image to the digital media file, and processing the digital image to generate a score. The score is based at least in part on a uniqueness of the digital image. The actions further include responsive to determining that the score for the digital image satisfies a threshold, associating the digital image to the digital media file such that a representation of the digital image provides access to the digital media file, generating data representing a physical document that includes a representation of the digital image, and providing the data representing the physical document to a publisher such that the publisher prints one or more copies of the physical document.

In some implementations, the actions further include receiving, at the one or more processors, a representation of the digital image scanned from a physical document, and responsive to receiving the representation of the digital image, transmitting the digital media file.

In some implementations, obtaining the digital image includes generating an image from a video file. Scoring the digital image includes determining a score of the digital image using at least one of an image resolution test, an image uniqueness test, and an image quality test. The image uniqueness test of the digital image includes a measure of image uniqueness based on a perceptual hash of the digital image.

In some implementations, the actions further include obtaining user credentials, verifying the user credentials for authorization, and responsive to the user credentials being authorized, granting access control to the digital media file.

In some implementations, the actions further include responsive to determining that the score of the digital image satisfies a threshold, associating the digital media file to the digital image.

In some implementations, the actions further include receiving, at the one or more processors, a subsequent digital media file, obtaining, at the one or more processors, a subsequent digital image, receiving, at the one or more processors, a request to link the subsequent digital image to the subsequent digital media file, processing, at the one or more processors, the subsequent digital image to generate a score, the score being based at least in part on a uniqueness of the subsequent digital image, and responsive to determining that the score for the digital image satisfies a threshold, associating, at the one or more processors, the subsequent digital image to the subsequent digital media file such that a representation of the subsequent digital image provides access to the subsequent digital media file.

In some implementations, obtaining the digital image includes receiving a map file, identifying location information associated with the map file, and generating an image of the map file with the location information.

Details of one or more implementations are set forth in the accompanying drawings and the description below. Potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
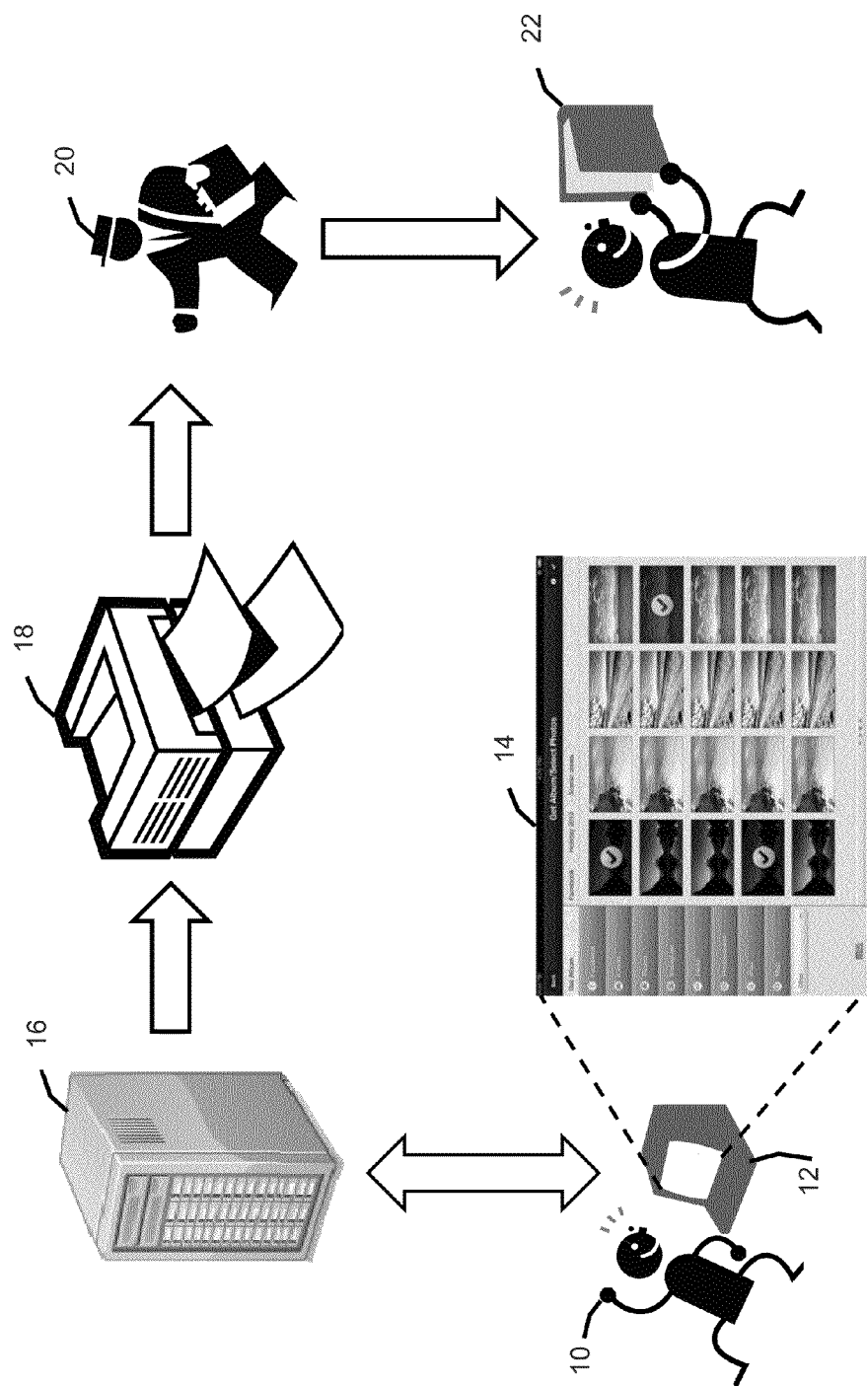
FIG. 1A is a diagram of an example system for generating physical documents that include augmented images.
Figure 1B:
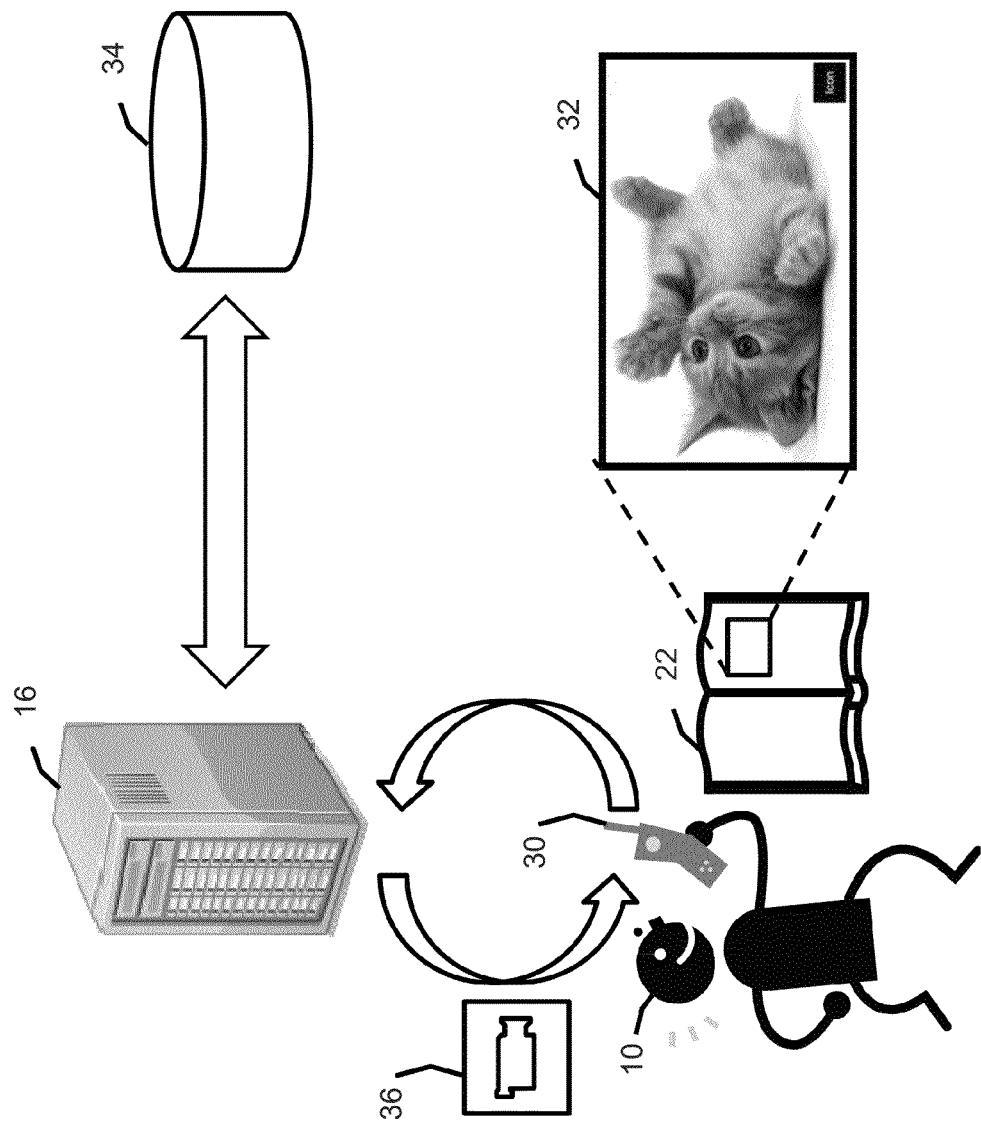
FIG. 1B is a diagram of an example process for enabling a user device to scan augmented images from a physical document and automatically retrieve and render digital media content associated with those images.

The present specification relates to an augmented reality system that permits a user to augment images in physical documents with digital media content. As described herein, "physical documents" include hard-copy documents such as paper or plastic based books, signage, or marketing materials, but do not include digital documents rendered on displays (e.g., images on an LED screen). FIGS. 1A and 1B provide a general overview of certain aspects of the system.

FIG. 1A shows an example system for generating physical documents that include augmented images. FIG. 1A includes a user 10 operating a user device 12 to specify content for a physical document (e.g., a photograph, photobook, calendar, or postcard). The user device 12 also communicates with a server 16 via any suitable networking technology such as, for example, the Internet or a wireless local area network (WLAN). The user device 12 and server 16 provide a user interface 14 for performing a number of operations. For instance, the user interface 14 enables the user to upload digital media content (also referred to as assets), which may include digital audio, video, graphics or global positioning system (GPS) data. The user interface 14 also enables the user to layout and design the physical document, including placing one or more images within the document. Certain images in the document may include or be derived from the assets uploaded by the user as described in more detail below.

The user interface 14 also permits the user 10 to link one or more images in the physical document with one or more other assets, such as video or audio. By linking an image with another asset, a user (either the original user 10 or another user) will be able to scan the image with a user device and receive the linked assets or data indicating a location of the asset (e.g., YouTube link) on their user device. Once the user 10 finishes specifying the content for the physical document (e.g., after uploading all assets, linking images to assets, and choosing a desired layout and design), the server 16 formats the physical document for printing and sends a request to a publisher 18 to have one or more physical documents generated. The publisher 18 then sends the finished physical document 22 to the user 10 via a suitable delivery mechanism 20 (e.g., parcel post).

FIG. 1B shows an example process for enabling a user device to scan augmented images from a physical document 22 and automatically retrieve and render digital media content associated with those images. For example, once the user 10 receives the physical document 22, the user 10 may operate an application on their smartphone 30 to scan an augmented image 32 in the document 22 using a camera on the smartphone 30. The application on the smartphone 30 then uploads data (e.g., the scanned image 32 and/or data derived from the scanned image 32) to the server 16. The server 16 processes the received data and accesses a database 34 to determine whether any digital media content is associated with the scanned image 32. When content, such as a video 36, is associated with the scanned image 32, the server 16 transmits the content or data indicating a location of the content back to the smartphone 30 for display to the user 10.

Figure 1C:
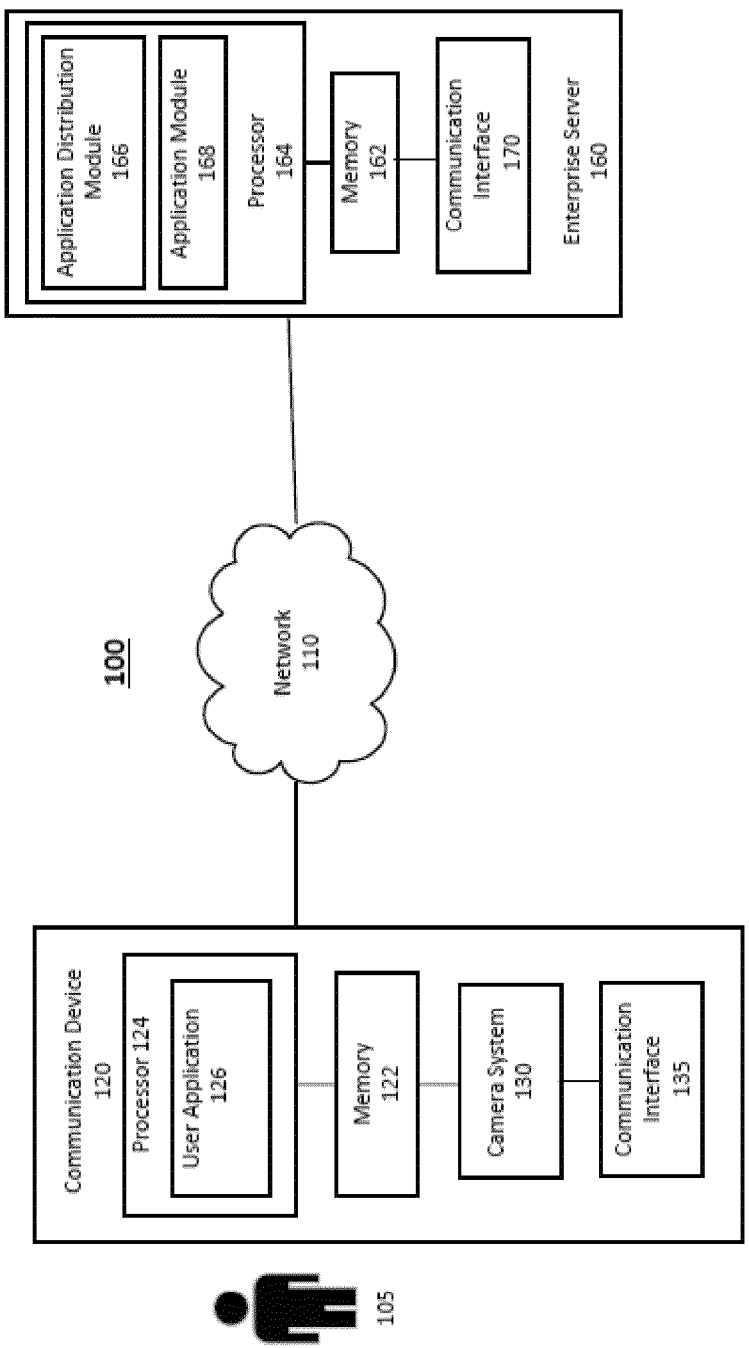
FIG. 1C is a system block diagram of an example system that can provide augmented reality services for user content to a user.

In more detail, FIG. 1C shows an example system 100 that can provide augmented reality services for user content to a user. FIG. 1C shows a system 100 that can capture a digital image from a user's interactive content (e.g., movies, location, etc.) from a user device 120, identify and validate the quality of the selected digital image, and associate the selected digital image to a video file, a map file, or a slideshow of a set of image files. In some implementations, the system 100 can receive a map file, identify the location information associated with the map file, and generate an image of the map file with the location information by transposing the location information onto the map file.

The system 100 shown in FIG. 1C includes a network 110, a user device 120 (e.g., user device 12 or smartphone 30 described above), and an enterprise server 160 (e.g., server 16 described above). The network 110 can be any type of network (e.g., a local area network (LAN), a wide area network (WAN), a virtual network, and a telecommunications network) implemented as a wired network and/or a wireless network. As described in further detail herein, in some implementations, the user device 120 can be connected to the enterprise server 160 via network 110 that can include an intranet, an Internet Service Provider (ISP) and the Internet, a cellular network (e.g., network 110), and/or the like.

The user device 120 can be any user device such as, for example, a desktop computer, a laptop computer, a personal digital assistant (PDA), a mobile telephone, a smart phone, a tablet personal computer (PC), smart glasses, wearable electronic devices (e.g., electronic watch), and/or so forth. The user device 120 includes a memory 122, a processor 124, a camera system 130, and a communication interface 135. The memory 122 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 122 can store instructions to cause the processor 124 to execute modules, processes and/or functions associated with the user device 120 and/or the augmented reality system 100. The processor 124 can be a general purpose processor, a Field Programmable Gate Array (FPGA), an Application Specific Integrated Circuit (ASIC), a Digital Signal Processor (DSP), and/or the like. The processor 124 can run and/or execute applications, modules, processes and/or functions associated with the user device 120 and/or the augmented reality system 100.

The processor 124 also executes a user application 126. The user application 126 can be received via the network 110 from the enterprise server 160. In some configurations, the user application 126 can be a hardware module and/or a software module (stored in memory 122 and/or executed in a processor 124) that is installed and executed directly in the user device 120. The user application 126 can cause the processor 124 to execute sub-modules, processes and/or functions associated with the user device 120, the enterpriser server 160, and/or the augmented reality system 100.

The user device 120 includes a camera system 130 that can include, for example, focusing lenses, a flash, one or more sensor devices (e.g., one or more video cameras, still cameras, infrared cameras, night vision cameras, etc.) or other devices capable of capturing static images and/or video from the environment surrounding the user device 120. In some instances, camera system 130 can feature other electronics and circuitry involved in operating the one or more camera devices. The camera system 130 can be used to obtain a digital image of an image file or a map file and/or a video of an event within a pre-determined location of the user device 120 and send the digital image and/or the video file to the user application 126 for further processing. Furthermore, in some implementations, the camera system 130 can also feature one or more other sensors, such as one or more microphones, motion sensors, contact sensors, light sensors, environmental or monitoring sensors, and/or the like.

The user device 120 includes a communication interface 135, which is operably coupled to the communication interfaces of the different devices and/or modules and/or servers described in FIG. 1C. The communication interface 135 can include one or multiple wireless port(s) and/or wired ports. The wireless port(s) in the communication interface 135 can send and/or receive data units (e.g., data packets) via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol), 4G long term evolution (4G LTE) protocol), and/or the like. In some instances, the wired port(s) in the communication interface 135 can also send and/or receive data units via implementing a wired connection between the user device 120 and the enterprise server 160. In such instances, the wired connections can be, for example, twisted-pair electrical signaling via electrical cables, fiber-optic signaling via fiber-optic cables, and/or the like.

The enterprise server 160 can be, for example, a web server, an application server, a proxy server, a telnet server, a file transfer protocol (FTP) server, a mail server, a list server, a collaboration server and/or the like. The enterprise server 160 includes a memory 162, a processor 164 and a communication interface 170. The memory 132 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 162 can store instructions to cause the processor 164 to execute modules, processes and/or functions associated with the enterprise server 160 and/or the augmented reality system 100. The processor 164 can be a general purpose processor, a Field Programmable Gate Array (FPGA), an Application Specific Integrated Circuit (ASIC), a Digital Signal Processor (DSP), and/or the like. The processor 164 can run and/or execute applications, modules, processes and/or functions associated with the enterprise server 160 and/or the augmented reality system 100.

In some implementations, the enterprise server 160 may include one or more repositories or may be coupled to one or more repositories. These repositories may store data from one or more enterprises and data (e.g., image) sources.

The processor 164 includes an application distribution module 166 and an application module 168. The application distribution module 166 can be a hardware and/or software module (that is stored in memory 162 and/or executed in processor 164). The application distribution module 166 can send user application files (e.g., executable files) to different user devices 120 associated with users that are authorized and registered customers of the enterprise. The application distribution module 166 can send the user application files as, for example, as executable file(s), via the network 110 to the user device 120 that is registered with an authorized user 105. Such an executable file(s) can then be installed by the processor 124 of the user device 120.

The application module 168 can be a hardware and/or software module (that is stored in memory 162 and/or executed in processor 164) that can process application data associated with the augmented reality system 100 and/or provide application data to user applications 126 installed on the different (registered) user devices 120 via the network 110. For example, in some instances, the application data processed (or analyzed) by the application module 168 can include stored user credentials for user authorization purposes, data representing a mapping table that can compare a received digital image to a stored digital image (i.e., an asset), instructions associated with status symbols to be displayed on a graphic user interface (GUI) of the user application 126, data linking a stored digital image file (e.g., an asset) to a user account, stored hash values of different digital images, stored location values associated with different map files, and/or the like. In some implementations, the application module 168 can be located in a third party server distinct from the entity (e.g., company) with which the enterprise server 160 is associated and is operably coupled to the enterprise server 160.

The enterprise server 160 includes a communication interface 170, which is operably coupled to the communication interfaces of the different devices and/or modules and/or servers described in FIG. 1. The communication interface 170 can include one or multiple wireless port(s) and/or wired ports. The wireless port(s) in the communication interface 170 can send and/or receive data units (e.g., data packets) via a variety of wireless communication protocols such as, for example, a wireless fidelity (Wi-Fi®) protocol, a Bluetooth® protocol, a cellular protocol (e.g., a third generation mobile telecommunications (3G) or a fourth generation mobile telecommunications (4G) protocol), 4G long term evolution (4G LTE) protocol), and/or the like. In some instances, the wired port(s) in the communication interface 170 can also send and/or receive data units via implementing a wired connection with the user device 140. In such instances, the wired connections can be, for example, twisted-pair electrical signaling via electrical cables, fiber-optic signaling via fiber-optic cables, and/or the like.

In some implementations, the user 105 can first login into the user application 126 of the user device 120 associated with the user 105. The user 105 can input specific user credentials as user authentication information into the user application 126. Examples of user credentials can include a user login, a user password, a user ID number, a personal identification number (PIN), biometric information (e.g., data associated with a fingerprint scan, a retinal scan, etc.), and/or the like. The user application 126 can receive the user credentials and send the user credentials to the enterprise server 160 via the network 110.

The application module 168 can receive the user credentials from the user application 126 (or a mobile browser window) via the network 110 and can authenticate the user 105. In some implementations, the application module 168 can authenticate the user by matching the user credentials to a specific entry in a user authentication database or a look-up table stored in the memory 162 of the enterprise server 160. The user authentication database can include, for example, a list of registered users and their social security numbers, user personal identification numbers (PIN), biometric information, and/or the like. In other implementations, the user authentication database can be stored in the memory of another device (e.g., a third party server not shown in FIG. 1) operatively coupled to the enterprise server 160. In various implementations, the application module 168 can authenticate the user using any suitable authentication protocol such as, for example, Secure Sockets Layer (SSL), Secure Shell (SSH), Kerberos, and/or the like.

After successful authentication (or authorization) of the user, the application module 168 can send a signal to the user application 126 to confirm the user authentication and including instructions to allow the user 105 access to the different functionalities of the user application 126. In some implementations, authenticating a user (or verifying the user credentials for authorization) includes determining a subscription status of a user associated with the user credentials, and determining whether the user account associated with the user credentials includes stored known assets. The user 105 can use the user application 126 to create or upload a digital image of, for example, a map file, an image from a slideshow of a set of images, or an image created from a random frame or a user selected frame of a video file to define an asset.

An asset may be a digital image that meets a number of pre-determined criteria (described in greater detail below) and is stored in a database operably coupled to the application module 168 and/or the user application 126 that can be used to link to a slideshow of a set of images and/or a video file and/or location information associated with a map to provide an augmented reality service for user content. In such implementations, when an image is viewed via the camera system 130 (or any other optical device) matches a stored asset, the associated photoproduct (e.g., a slideshow of images, a video, a map with location information) can be displayed with the image to generate an augmented reality experience for the user 105. An asset can include one of a map image, a frame of the video file, or an image associated with a slideshow of images.

In some implementations, the user 105 can use the camera system 130 of the user device 120 to take a digital image from a slideshow of a set of images, or take a digital image of a map, or capture a video of events occurring within a pre-determined distance of the user device 120 (e.g., significant life events such as a birthday party, a college graduation party, a picnic, a professional conference, a wedding, etc.).

In some implementations, the user 105 can select the type of photo product they would like to create (e.g., a photograph, photobook, book with album cover art, calendar, postcards, or other types of similar products). The user 105 can also choose to add an asset in the user application 126 and then proceed to select an asset (e.g., photograph or video) from a local storage in the user device 120 (e.g., a hard disk), a cloud storage, or a third party service (e.g., Facebook, Instagram, Google-+, Picasa, etc.).

After obtaining a digital image from a photoproduct, the digital image can be temporarily stored in, for example, a database operably coupled to the user application and/or the application module 168. The user application 126, the server 160, or a combination of the user application 126 and the server 160, can receive a representation of the digital image and score the digital image based on uniqueness of the digital image, the minimum print specifications for selected photo product, and quality of the digital image used for an augmented reality experience.

In some implementations, for the minimum print specifications test, the user application 126 can obtain the desired dimensions (e.g., width and height in cm or inches) of typical assets of a particular class (e.g., a map file, an image file, a video file) that are stored in a database. In such implementations, the user application 126 can, for example, in some instances, multiply the number '270' by the pre-determined desired width of an asset and compare the value obtained with the width of the received digital image. In some instances, if the value obtained is less than the width of the received digital image, a score of '1' is generated for the width parameter. In other instances, if the value obtained is greater than the width of the received digital image, a score of '0' is generated for the width parameter. In such implementations, the user application 126 can also, for example, multiply the number '270' by the pre-determined desired height of an asset and compare the value obtained with the height of the received digital image. In some instances, if the value obtained is less than the height of the received digital image, a score of '1' is generated for the height parameter. In other instances, if the value obtained is greater than the height of the received digital image, a score of '0' is generated for the height parameter. In such implementations, the user application 126 can add the two scores generated above. If the two scores generated above equals to '2,' the user application 126 can determine that the digital image has passed the minimum print specifications test and proceed to the uniqueness test of the digital image. If the two scores generated above equal to a value less than '2,' the user application 126 can determine that the digital image has failed the minimum print specifications test and proceed to generate an error message (e.g., error_msg="print specification error") in the GUI of the user device 120. The number '270' can be used in the minimum print specifications test because '270' represents the number of dots per inch that is typically associated with a digital image to generate high quality printed results.

In some implementations, for the uniqueness test of the digital image, the user application 126 can send the digital image to the application module 168 via the network 110. The application module 168 can generate a perceptual hash of the received digital image and store the hash value in a database operably coupled to the user application 126 and/or the application module 168. In such implementations, the application module 168 can implement one or more different perceptual image hash functions to generate the hash value or hash string of the received digital image, such as, for example, discrete cosine transform based hashes, Marr-Hildreth Operator based hashes, radial variance based hashes, discrete wavelet transform based hashes, singular value decomposition based hashes, hashes using feature points, and/or block mean value based hashes.

The application module 168 can include a hashing engine (not shown explicitly in FIG. 1C) that can apply a perceptual hash function to any digital image to generate a hash (i.e., the hash value or the hash string). In some instances, the hash value or string generated for the digital image can have a high degree of exclusivity such that any (accidental or intentional) change to the data associated with the digital image may (with very high probability) change the hash value of the digital image. The hash value that represents the particular digital image can be computed for any given image stored in the user device 120 and/or the enterprise server 160. Additionally, the hash value for the digital image can be generated in such a manner that it may not be feasible to re-generate the digital image back from its given hash value, and it may not be feasible to find two different digital images with the same hash value. The application module 168 can implement different hash function generation techniques to define the hash value or hash sting of the digital image.

The application module 168 (in the enterprise server 160) can compare the hash value of the digital image to the hash values of known assets stored in the database operably coupled to the application module 168. The application module 168 can use any suitable hash value comparison methods to compare the hash values generated of the digital image to the stored hash values of known assets as described above. For example, in some instances, it is desirable for the application module 168 to be able to perform fast comparison of calculated on-the-fly hash values of the digital image with the hash values of known assets.

After comparison of the hash values of the digital image with that of the stored hash values of known assets, if it is determined that the hamming distance between two compared hash values is greater than a threshold (e.g., 26), the application module 168 can determine that the digital image has passed the uniqueness test and proceeds to perform the quality of the digital image test. If it is determined that the hamming distance between two compared hash values is less than the threshold (e.g., 26), the application module 168 adds a score of '0' to the uniqueness parameter and determines that the digital image failed the uniqueness test and proceeds to generate a signal that displays an error message (e.g., error_msg="uniqueness error") in the GUI of the user application 126.

In some implementations, for the quality of the digital image test, the application module 168 can assess the quality of the digital image by checking the resolution (e.g., dots per inch), the size, the compression information, the metadata and other such data associated with the digital image. If the parameters of the digital image assessed meets a set of pre-determined criteria, the application module 168 can add a score of '1' to the quality parameter and can determine that the digital image has passed the quality test. If the parameters of the digital image assessed does not meet the set of pre-determined criteria, the application module 168 can add a score of '0' to the quality parameter and can determine that the digital image has failed the quality test and can proceed to generate a signal that displays an error message (e.g., error_msg="quality error") in the GUI of the user application 126.

If it is determined that the digital image has successfully passed the three tests described above, the application module 168 can define the received digital image to be a new and valid asset and can store the new asset and the hash value of the digital image (or new asset) in a database that is operably coupled to the application module 168 and/or the user application 126. The application module 168 can also store the selected photoproduct (e.g., a slideshow of images, a video, a map with location information) associated with the new asset in a database that is operably coupled to the application module 168 and/or the user application 126. Furthermore, the application module 168 can link the new asset with its associated photoproduct such that the user 105 can receive the linked photoproduct through the augmented reality system 100 when the user 105 scans or accesses the stored asset via the camera-enabled user device 120.

Note that the augmented reality system 100 described in FIG. 1C is not limited to the particular type of scoring system described above, and may vary accordingly. The augmented reality system 100 is, without limitation, an interactive process (or method) to enable processing of user generated content from a user device 120 that makes static photo products presented on a user device 120 interactive and multi-dimensional.

Figure 2:
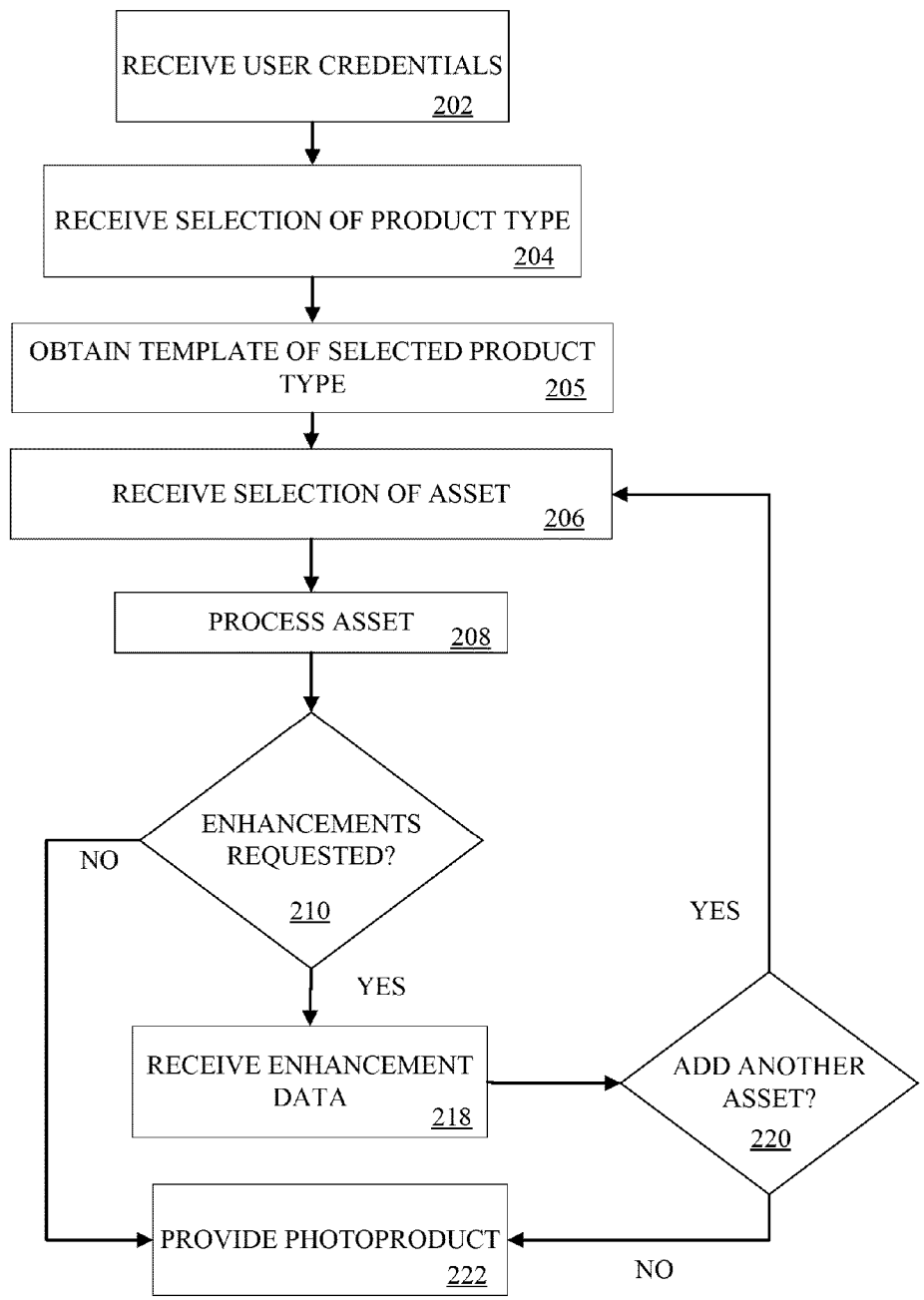
FIG. 2 is a flow chart illustrating an example method for receiving an asset and providing a photoproduct in response.

FIG. 2 is a flow chart illustrating an example method for receiving an asset and providing a photoproduct in response. In some implementations, the process 200 may be performed by the system 100, and will be described as such for clarity. The process 200 includes receiving user credentials, at 202. As described above, the user credentials can be entered into the user device 120 by the user 105 and can include, for example, a user login, a user password, a user ID number, a personal identification number (PIN), biometric information (e.g., data associated with a fingerprint scan, a retinal scan, etc.), and/or the like. The user credentials can be compared with stored credentials of known authenticated users to authorize a user to access the user application 126 and the augmented reality system 100.

At 204, a selection of a product type can be received at, for example, the user application 126. After the user has been successfully authorized, the user can select a product type. Examples of product types (or photo products) can include a photo, photo album, a calendar, a video file, etc. The selection of the product type can be made by the user on a GUI associated with the user application 126 in the user device 120.

At 205, a template of the selected product type can be received at, for example, the user application 126. The selection of the template of the selected product type can be made by the user on a graphic user interface (GUI) associated with the user application 126 in the user device 120. For example, in some instances, if the product type selected is a photo album, the template of the product type can determine the number of photos in the photo album, the size of each photo, the number of photos in each page of the photo album, the organization of the photos on each page of the photo album, etc. For example, in other instances, if the product type selected is a video file, the template of the product type can determine the size range of the video file, the resolution of the video file, the format of the video file, the frame rate of the video file, the compression type of the video file, etc.

At 206, a selection of an asset is received at, for example, the user application 126. As described above, an asset may be a digital image that meets a number of pre-determined criteria and is stored in a database operably coupled to the application module 168 and/or the user application 126 that can be used to link to a slideshow of a set of images and/or a video file and/or location information associated with a map to provide an augmented reality service for user content. An asset can include one of a map image, a frame of the video file, or an image associated with a slideshow of images. In some implementations, when the asset is a frame of the video file, the user can select a random frame from the video file, or select a mosaic of multiple frames from the video file, or select a specific frame from the video file.

After receiving the selection of the asset, the user application 126 can send the received asset to the application module 168 via the network 110 for further processing. At 208, the asset can be processed at, for example, the application module 168. Processing the asset can include, for example, customizing the asset, generating the hash value of the asset and matching the generated hash value with stored hash values of known assets (that are stored in a hash table) to generate a score to determine the authenticity of the asset, and/or the like. The processing of different kinds of assets will be discussed in greater detail with respect to FIG. 3 below.

At 210, it is determined if enhancements have been requested at, for example, the user application 126. The request for enhancements can be entered by the user in the GUI associated with the user application 126. If enhancements are requested by the user, the enhancement data can be received at, for example, the user application 126, at 218. The enhancement data can include, for example, additional text, additional images, a dedication to a person, and/or the like. The enhancement data can be entered by the user 105 at the GUI of the user application 126. At 220, after receiving the enhancement data, the user application 126 can add the enhancement data to the asset and prompt the user 105 to add another asset. If the user wishes to add another asset, a selection of a new asset can be received at, for example, the user application 126, at 206. If the user does not wish to add another asset, the augmented reality system 100 can link the appropriate photoproduct to the asset and provide the photoproduct for display at the user device 120, at 222. If enhancements to the asset were not requested by the user, the augmented reality system 100 can also link the appropriate photoproduct to the asset and provide the photoproduct for display at the user device 120, at 222.

Figure 3:
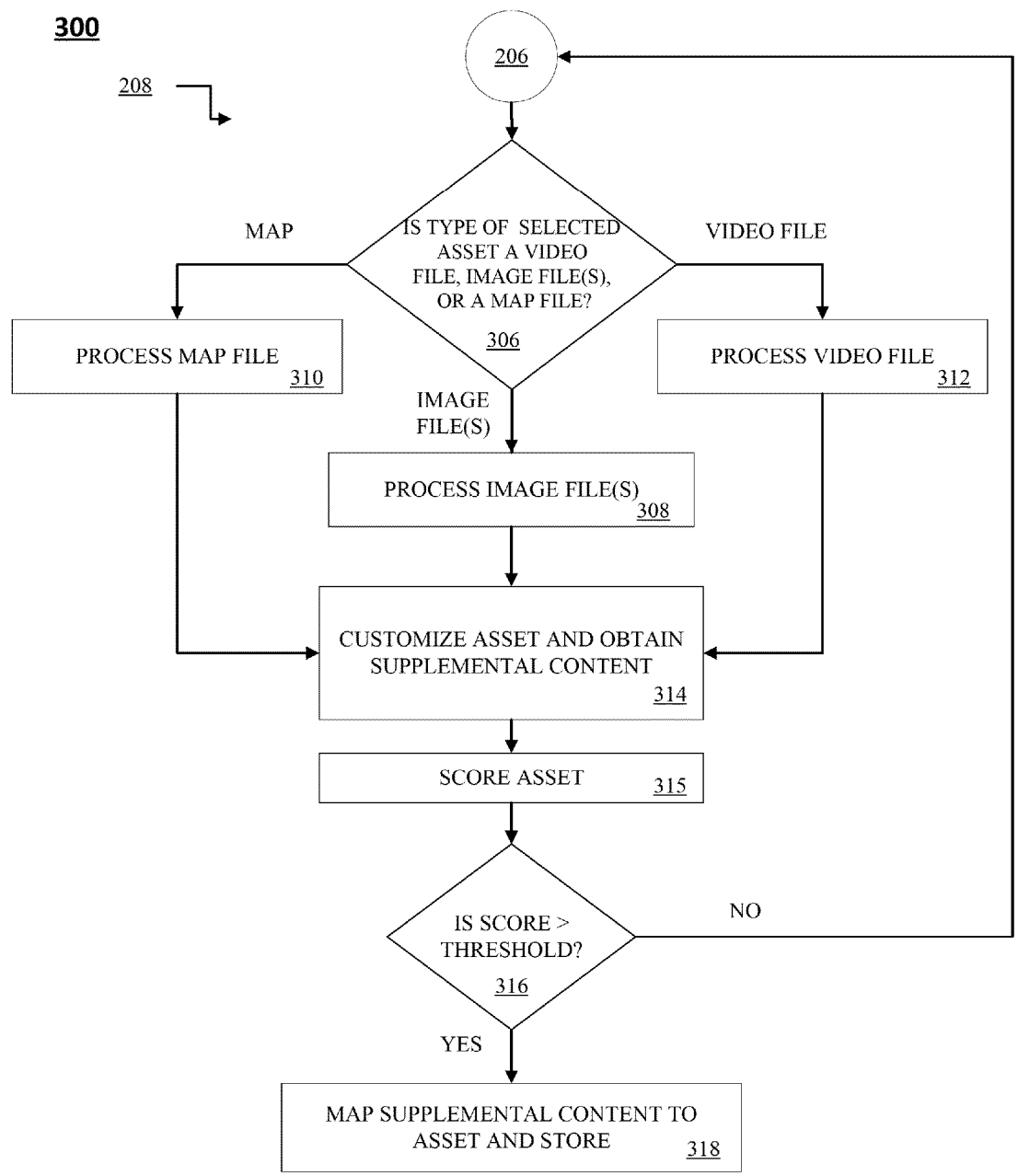
FIG. 3 is a flow chart illustrating an example method for processing different kinds of assets and linking the appropriate photoproducts to the assets in response.

FIG. 3 is a flow chart illustrating an example method for processing different kinds of assets and linking the appropriate images to the assets in response. The method 300 expands upon the details of step 208 in FIG. 2. In some implementations, the method 300 may be performed by the system 100 in FIG. 1, and thus will be described with reference to such for clarity. Referring to FIGS. 1, 2 and 3, at 206, a selection of an asset is received at, for example, the user application 126. At 306, a determination is made if the type of the selected asset is an image file(s), a video file or a map file. Such determination can be made at, for example, the user application 126 using any suitable techniques to detect the asset type. For example, the user application 126 can analyze the tags associated with the asset (e.g., JPEG tags, TIFF tags, MPEG tags, etc.) and/or the metadata associated with the asset to determine if the selected asset is an image file(s), a video file or a map file.

At 308, if the type of the selected asset is an image file(s), the image file(s) can be processed at, for example, the user application 126. Processing of the image files can involve several steps as described herein. At, 314, the image file(s) can be customized (or modified) by, for example, the user application 126 to fit the selected template of the photoproduct. Customizing the image file(s) can include, for example, cropping the image file(s), stretching the image file(s), compressing the image file(s), and/or the like. Additionally, at 314, supplemental content associated with the asset can be obtained at, for example, the user application 126. In some instances, the supplemental content can be, for example, the photoproduct associated with the asset. In such instances, the supplemental content can be the slide show of the set of images from which the asset (i.e., the image file(s)) has been selected.

At 315, the asset can be scored at, for example, the application module 168. As described above, the user application 126 can send the asset (after customization) to the application module 168 (running on the enterprise server 160) via the network 110. As described above, the application module 168 can score the image file(s) based on one or more of the uniqueness of the image file(s), the minimum print specifications for the selected photo product, and the quality of the image file(s). Note that other parameters and scoring mechanisms can be included in the scoring process in place of or in addition to those described above.

At 316, analysis steps are performed at, for example, the application module 168 to determine if the score generated from the scoring steps above is greater than a determined threshold set in the user application 126. As described above, the determination can be made by, for example, adding the score of the different scoring steps and generating an aggregated score. In some implementations, the determined threshold can be set by, for example, the user after the selection of the type of photoproduct.

If the score generated from the scoring the asset is greater than the determined threshold, the supplemental content can be linked or mapped to the asset and stored, at 318. The linking or association of the supplemental content to the asset can be performed by, for example, the application module 168 and the asset and the supplemental content can be stored in, for example, a mapping table in a database that is operably coupled to the enterprise server 120 and/or the user device 120.

In some implementations, if the score generated from scoring the asset is less than the determined threshold, the user application 126 displays an error message to the user and prompts the user to enter another selection of an asset or a subsequent selection of an asset. The user application 126 can receive a new selection of the asset, at 206.

In some implementations, if the score generated from scoring the asset is less than a particular rescoring threshold set in the user application 126 (e.g., if the score is less than 80%), the user application 126 may perform one or more operations and subsequently re-score the asset. In some cases, if the score generated from scoring the asset is less than the particular scoring threshold set in the user application 126, the user application 126 may display a message to the user to prompt the user to select one or more operations, including but not limited to, an Unsharpen Mask operation to add contrast to the asset, a resizing operation to resize the asset, and, in general, any operation that may change the quality and/or score of the asset. Upon receiving an input from the user indicating a selection of the one or more operations, the selected one or more operations are performed by the user application 126 and the asset is subsequently rescored.

For example, if the user selects an Unsharpen Mask operation, the user application 126 may perform the Unsharpen Mask operation to improve the contrast properties of the asset. After performing the Unsharpen Mask operation, the user application 126 may rescore the asset to determine if the score of the asset is greater than the particular scoring threshold. If the score generated from rescoring the asset is still less than the particular scoring threshold, in some cases, the user application 126 may prompt the user again to determine if the user would like the user application 126 to perform one or more operations. In some cases, the user application 126 may display an error message to the user and prompt the user to enter another selection of an asset or a subsequent selection of an asset, at 206, as described above.

It should be understood that the user may select more than one operation to change the quality and/or score of the asset. If multiple operations are selected, the multiple operations may be performed in any sequential order. Further, it should be understood that the particular rescoring threshold may be different or the same as the determined threshold based on the settings of the user application 126.

At 310, the type of the selected asset is determined to be a map file. At 314, the map file can be customized (or modified) by, for example, the user application 126 to, for example, fit the selected template of the photoproduct. Customizing the map file can include, for example, cropping the map file, stretching the map file, compressing the map file, and/or the like. Additionally, at 314, supplemental content associated with the asset (i.e., map file) can be obtained at, for example, the user application 126. In some implementations, the supplemental content can be, for example, geographical location information such a latitude and longitude co-ordinates obtained from a global positioning system (GPS) readout. In such implementations, the geographical location information can be superimposed on the map file in the form of, for example, a location beacon or pointer to customize the asset. The map file (or asset) is then scored and analyzed in steps 315, 316, respectively, as described above, and also associated or linked to the supplemental content in a mapping table if the score of the asset is determined to be greater than the determined threshold, at 318.

If the score generated from the scoring the map file is less than the determined threshold, the user application 126 can display an error message to the user and prompt the user to enter another selection of an asset or a subsequent selection of an asset. The user application 126 can receive a new selection of the asset, at 206.

At 312, the type of the selected asset is determined to be a selected frame from a video file. At 314, the selected frame of the video file can be customized (or modified) by, for example, the user application 126 to, for example, fit the selected template of the photoproduct. Customizing the video file can include, for example, adding customized thumbnails to the selected frame of the video file, trimming the selected frame of the video file, compressing the selected frame of the video file, changing the start time and stop time of the selected frame of the video file, and/or the like. Additionally, at 314, supplemental content associated with the video file can be obtained at, for example, the user application 126. In some implementations, the supplemental content can be, for example, a video file capturing a significant life event of the user. The asset is then scored and analyzed in steps 315, 316, respectively, as described above, and also associated or linked to the supplemental content in a mapping table if the score of the asset is determined to be greater than the determined threshold, at 318.

If the score generated from the scoring the selected frame of the video file is less than the determined threshold, the user application 126 can display an error message to the user and prompt the user to enter another selection of an asset or a subsequent selection of an asset. The user application 126 can receive a new selection of the asset, at 206.

Figure 4:
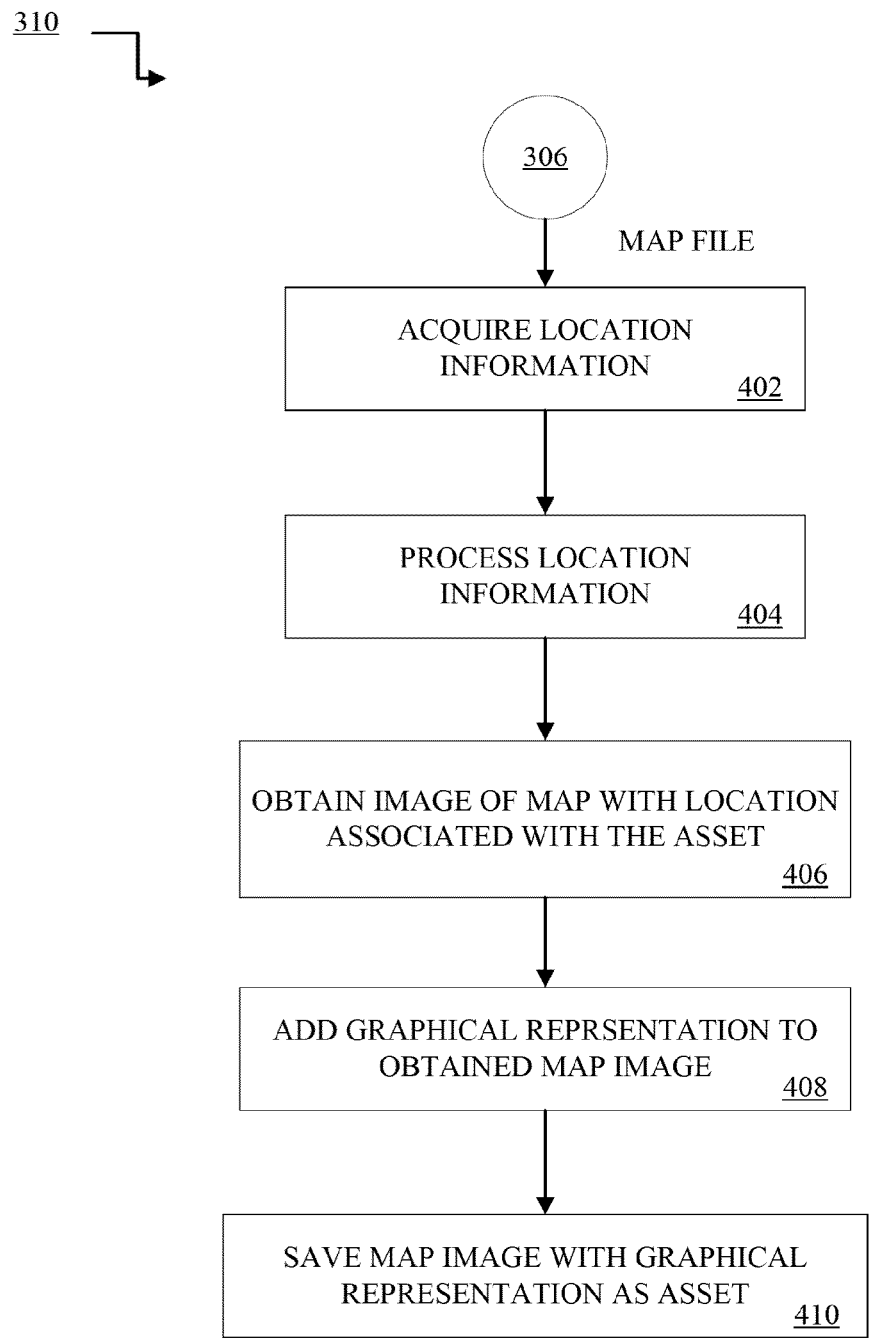
FIG. 4 is a flow chart illustrating an example method for processing an asset that is identified to be a map file.

FIG. 4 is a flow chart illustrating an example method for processing an asset that is identified to be a map file. The method 400 expands upon the details of step 310 in FIG. 3. In some implementations, the method 400 may be performed by the system 100 in FIG. 1C, and thus will be described with reference to such for clarity. Referring to FIGS. 1C, 3 and 4, at 306, a determination is made if the type of the selected asset is an image file(s), a video file or a map file. Such determination can be made at, for example, the user application 126 using any suitable techniques to detect the asset type as described above. If the determination is made that the type of the selected asset is a map file, location information associated with the geographic region represented in the map file is acquired by, for example, the user application 126, at 402. Examples of location information can include the latitude and longitude co-ordinates of the geographic region obtained from a GPS device, latitude and longitude co-ordinates of the geographic region obtained from a cell tower, a zip code of the geographic region or any other suitable location information obtained from a location based service.

At 404, the location information can be processed at, for example, the user application 126 and/or the application module 168. In some implementations, the user application 126 and/or the application module 168 may not receive accurate location information associated with the map file. In such implementations, the user application 126 and/or the application module 168 can estimate the location information associated with the map file by, for example, analyzing locations known to commonly represent larger, less precise geographical areas known as centroids in a general region covered by the map file. Examples of known centroids can include (but not limited to) third party databases for resolving the geographical location of an IP address of a user device, mapping databases that provide the center point of a postal code and/or political boundaries, major metropolitan landmarks (e.g., New York City's Grand Central Station), published latitudes and longitudes that are associated with major businesses, cities, regions, or attractions, wireless carrier databases of known cellular tower locations, etc.

At 406, an image of the map represented in the map file with location information associated with the asset is obtained at, for example, the user application 126. At 408, a graphical representation of the location information can be added to the map image by, for example, the user application 126. The graphical representation can be in the form of, for example, a beacon, a pointer, a barcode, or an icon that is superimposed on the map image or linked to the map image that denotes or represents a specific geographic location on the map image.

At 410, the map image with the graphical representation is defined as the asset and stored at a database that is operably coupled to the user application 126 and/or the application module 168. As described above, such a database can be located at the user device 120 and/or the enterprise server 160 and/or a third party server that is operably coupled to the user device 120 and/or the enterprise server 160 via the network 110.

Figure 5:
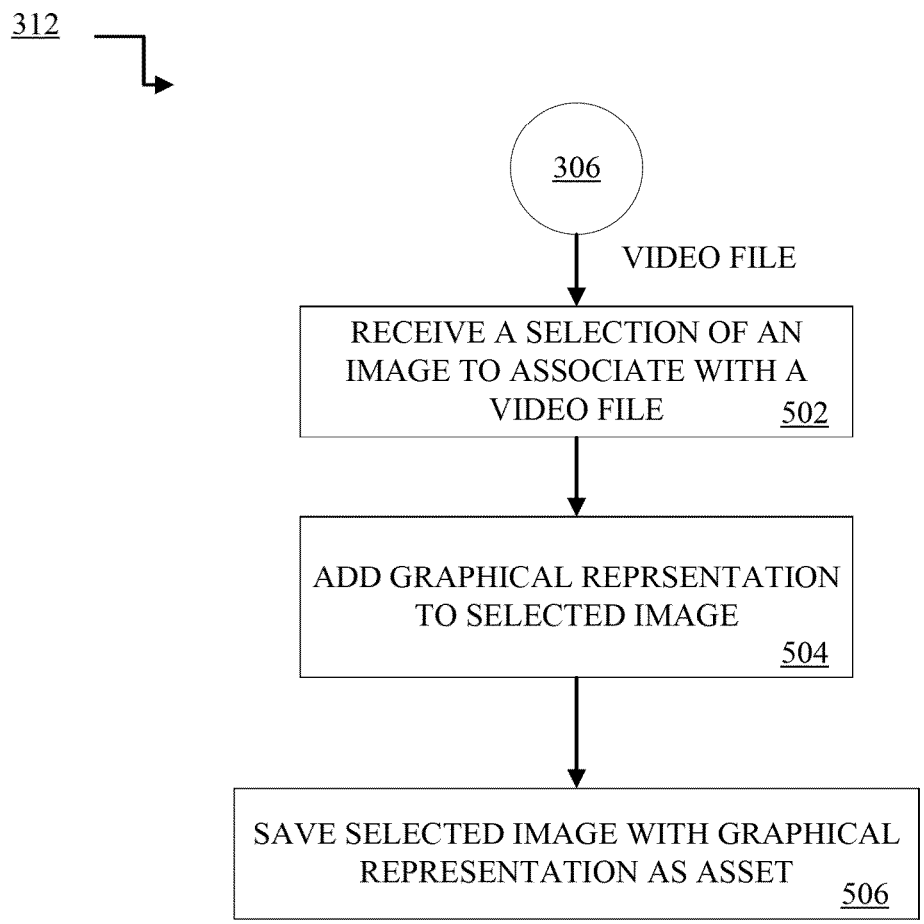
FIG. 5 is a flow chart illustrating an example method for processing an asset that is identified to be a video file.

FIG. 5 is a flow chart illustrating an example method for processing an asset that is identified to be a video file. The method 500 expands upon the details of step 312 in FIG. 3. In some implementations, the method 500 may be performed by the system 100 in FIG. 1C, and thus will be described with reference to such for clarity. Referring to FIGS. 1C, 3 and 5, at 306, a determination is made if the type of the selected asset is an image file(s), a video file or a map file. Such determination can be made at, for example, the user application 126 using any suitable techniques to detect the asset type as described above. If the determination is made that the type of the selected asset is a video file, a selection of an image can be received at, for example, the user application 126 to associate with a video file, at 502. As described above, the selection of an image can be a frame of the video file. In some implementations, when the type of asset is a video file, the user can select a frame from the video file (e.g., randomly or based on certain image characteristics) as the image or select a mosaic of multiple frames from the video file as the image.

At 504, optionally, a graphical representation can be added to the selected image at, for example, the user application 126. A graphical representation can be, for example, a barcode, an icon or any other marker on the selected image that can denote the selected image as activated for augmented reality operations when accessed. In such cases scanning of the graphical representation, for example, can allow the selected image to be supplemented or enhanced by computer-generated sound, video, graphics.

At 506, the selected image, optionally with the graphical representation, is stored as an asset in, for example, a database that is operably coupled to the user application 126 and/or the application module 168. As described above, such a database can be located at the user device 120 and/or the enterprise server 160 and/or a third party server that is operably coupled to the user device 120 and/or the enterprise server 160 via the network 110.

Figure 6:
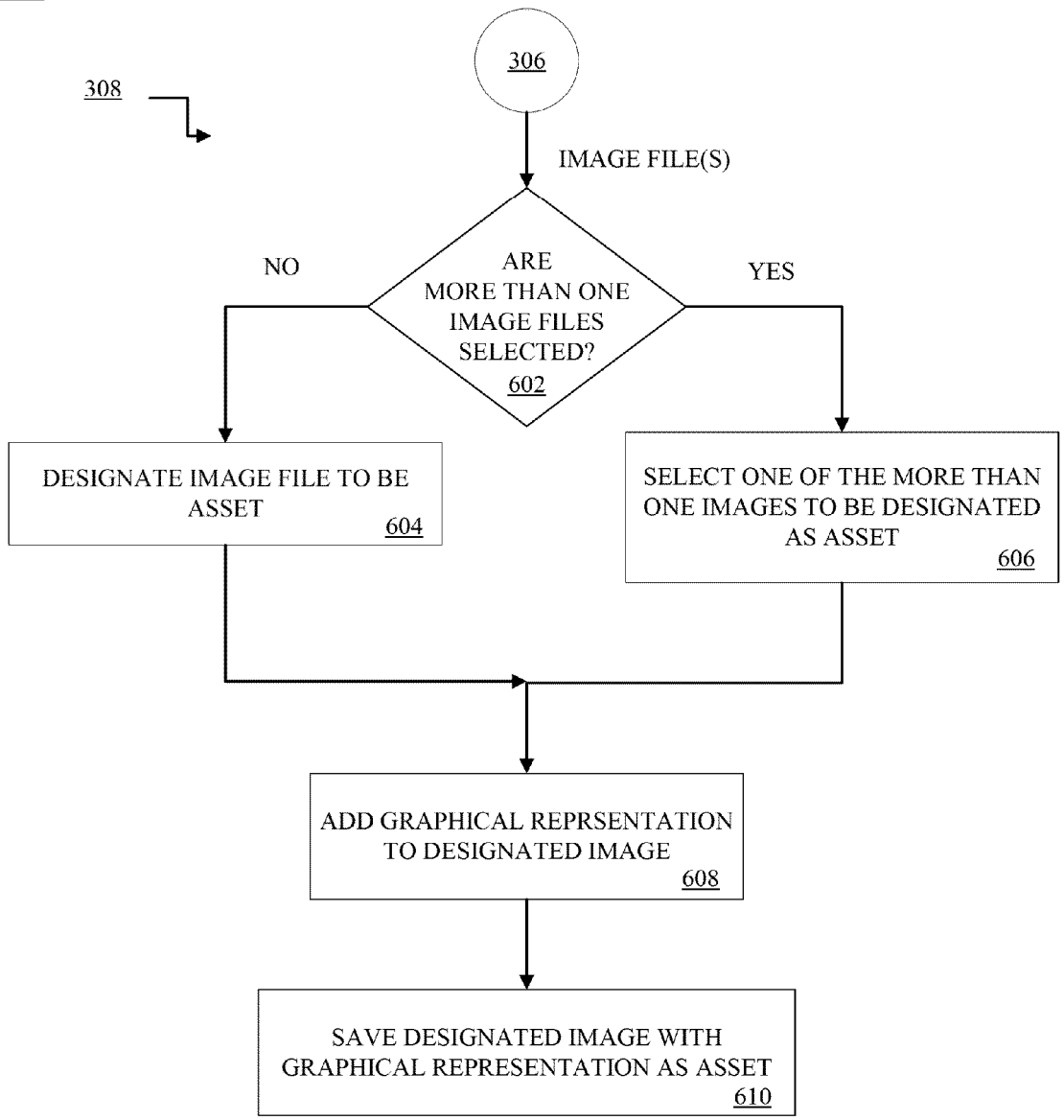
FIG. 6 is a flow chart illustrating an example method for processing an asset that is identified to be an image file.

FIG. 6 is a flow chart illustrating an example method for processing an asset that is identified to be an image file. The method 600 expands upon the details of step 308 in FIG. 3. In some implementations, the method 600 may be performed by the system 100 in FIG. 1, and thus will be described with reference to such for clarity. Referring to FIGS. 1, 3 and 6, at 306, a determination is made if the type of the selected asset is an image file(s), a video file or a map file. Such determination can be made at, for example, the user application 126 using any suitable techniques to detect the asset type as described above. If the determination is made that the type of the selected asset is an image file, a determination is made at, for example, the user application 126 if more than one image files are selected at, 602.

At 604, it can be determined that no more than one image file is selected to be the asset. Such determination can be made at, for example, the user application 126 using any suitable techniques to detect the number of image files selected as the asset. Additionally, at 604, the selected image can be designated to be an asset at, for example, the user application 126.

At 606, it can be determined that more than one image file is selected to be the asset. Such determination can be made at, for example, the user application 126 using any suitable techniques to detect the number of image files selected as the asset. Additionally, at 606, one image among the multiple images selected can be chosen to be designated to be the asset at, for example, the user application 126. In some implementations, the user application 126 can randomly choose one image among the multiple images selected to be designated to be the asset. In other implementations, the user application 126 can prompt the user to choose an image file from the set of image files to be designated as the asset.

At 608, optionally, a graphical representation can be added to the selected image at, for example, the user application 126. A graphical representation can be, for example, a barcode, an icon or any other marker on the selected image file that can denote the selected image file as activated for an augmented reality operation when accessed. In such cases, activation of the graphical representation, for example, can allow the selected image file to be supplemented or enhanced by a set of images in slideshow of images files that can be associated with a significant event in the user's life.

At 610, the selected image file, optionally with the graphical representation, is stored as an asset in, for example, a database that is operably coupled to the user application 126 and/or the application module 168. As described above, such a database can be located at the user device 120 and/or the enterprise server 160 and/or a third party server that is operably coupled to the user device 120 and/or the enterprise server 160 via the network 110.

Figure 7:
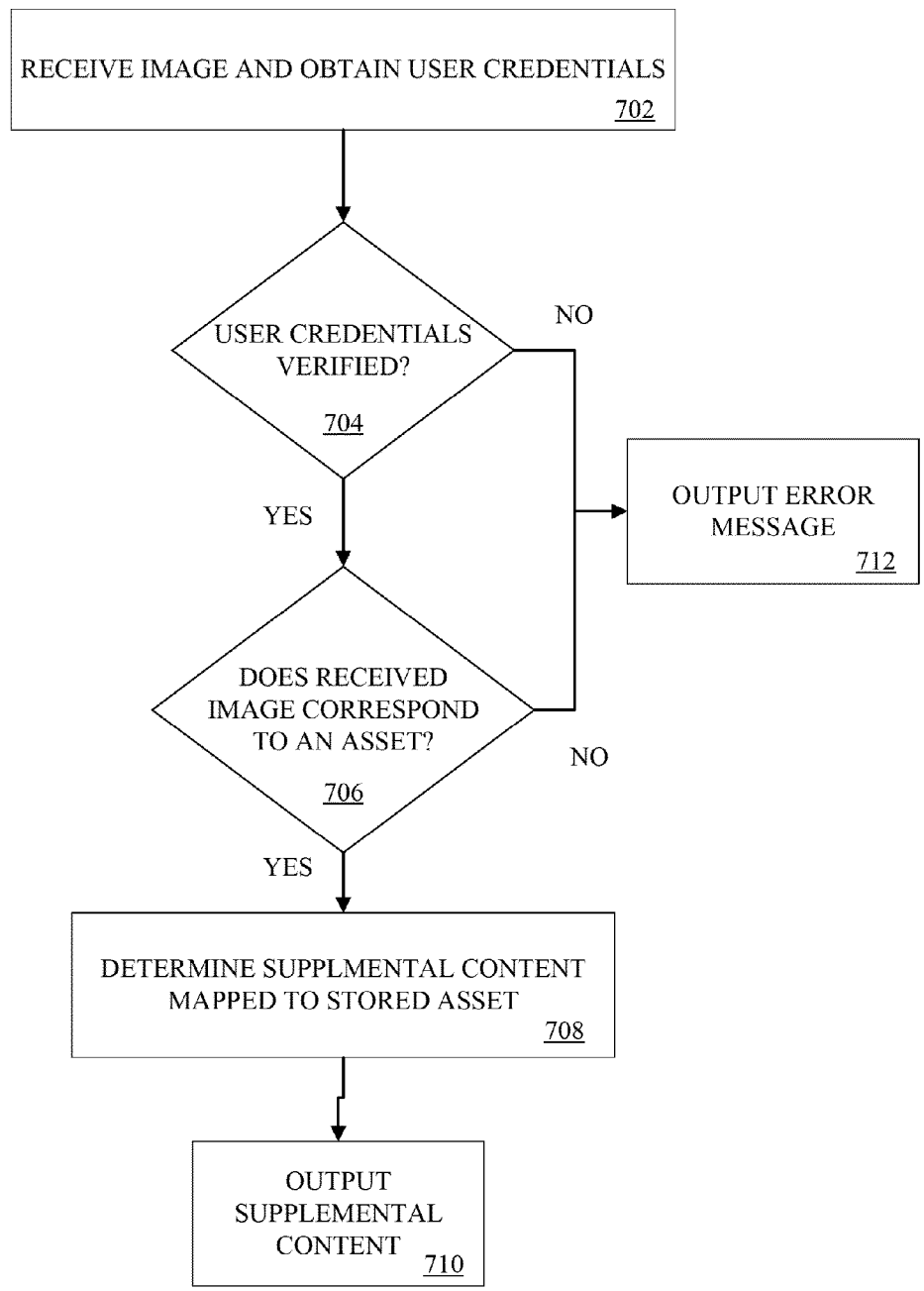
FIG. 7 is a flow chart illustrating an example method for authenticating the user credentials of a user and activating an image received from the user for an augmented reality operation.

FIG. 7 is a flow chart illustrating an example method for authenticating the user credentials of a user and activating an image received from the user for an augmented reality operation. In some implementations, the method 700 may be performed by the system 100 in FIG. 1, and thus will be described with reference to such for clarity. Referring to FIGS. 1 and 7, at 702, an image (e.g., a digital image) and a set of user credentials associated with a user 105 can be received at, for example, the user application 126. Examples of user credentials can a user login, a user password, a user ID number, a personal identification number (PIN), biometric information (e.g., data associated with a fingerprint scan, a retinal scan, etc.), and/or the like. The received image can be a digital image that is representative of an image file, a video file, or a map file.

At 704, the user credentials are verified at, for example, the application module 168. As described above, the application module 168 can receive the user credentials from the user application 126 (or a mobile browser window) via the network 110 and can authenticates the user. In some implementations, the application module 168 can authenticate the user by matching the user credentials to a specific entry in a user authentication database or a look-up table stored in the memory 162 of the enterprise server 160. The user authentication database can include, for example, a list of registered users and their social security numbers, user personal identification numbers (PIN), biometric information, and/or the like. In other implementations, the user authentication database can be stored in the memory of a third party device that is operatively coupled to the enterprise server 160. In various implementations, the application module 168 can authenticate the user using any suitable authentication protocol such as, for example, Secure Sockets Layer (SSL), Secure Shell (SSH), Kerberos, and/or the like.

If the user credentials provided by the user cannot be authenticated or verified, an error message can be output or displayed to the user, at 712. In some implementations, the application module 168 can send a signal to the user application 126 via the network 110 to display an error message on the GUI of the user application 126 (e.g., error_msg="invalid user—Goodbye").

If the user credentials provided by the user can be successfully authenticated or verified, an analysis step is performed at, for example, the application module 168 to determine if the received image corresponds to a digital image that is linked to another asset, at 706. In some implementations, the application module 168 can generate a perceptual hash value or a hash string of the received (digital) image and store the hash value or the hash string in a database operably coupled to the user application 126 and/or the application module 168. In such implementations, the application module 168 can implement one or more different perceptual hash function generation techniques to define the hash value or hash string of the received digital image. The application module 168 (in the enterprise server 160) can compare the hash value of the digital image to the hash values of known assets associated with the user account that are stored in the database operably coupled to the application module 168. The application module 168 can use any suitable hash value comparison methods to compare the hash values generated of the received (digital) image to the stored hash values of known assets as described above.

If it is determined that the received image does not correspond to a valid known asset, an output error message can be displayed to the user (e.g., error_msg="received image is not a valid asset"), at 712. In some implementations, the application module 168 can send a signal to the user application 126 via the network 110 to display an error message on the GUI of the user application 126.

If it is determined that the received image does correspond to a valid known asset, an analysis step is performed to determine the supplemental content associated with the asset and map or link the supplemental content to the asset, at 708. The linking or association of the supplemental content to the asset can be performed by, for example, the application module 168 and the asset and the supplemental content can be stored in, for example, a mapping table in a database that is operably coupled to the enterprise server 120 and/or the user device 120. In some implementations, the supplemental content can be, for example, the photoproduct associated with the asset. In such implementations, the supplemental content can be, for example, a slide show of the set of images from which the asset (i.e., the image file) has been selected, or a video file from which a frame was selected as the asset.

At 710, the supplemental content can be output to, for example, the GUI of the user application 126. In such cases, the received image when entered by the user in the user application 126 can be supplemented or enhanced by the execution of a set of images in slideshow of images files that is associated with a significant event in the user's life, or the execution of a video file that is associated with a significant event in the user's life, or the appearance of a set of geographical co-ordinates on a map file that can indicate a location that is associated with a significant event in the user's life.

Figure 8:
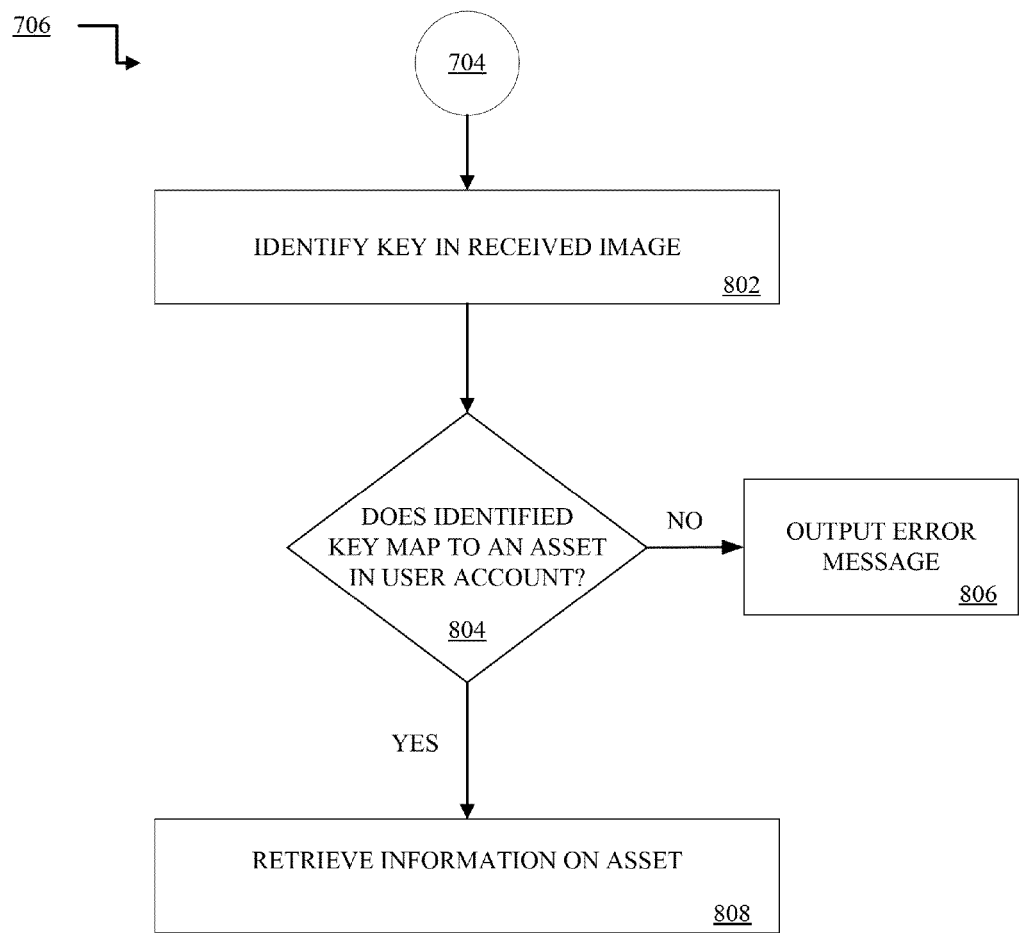
FIG. 8 is a flow chart illustrating an example method for determining if an image received from a user corresponds to a known asset.

FIG. 8 is a flow chart illustrating an example method for determining if an image received from a user corresponds to a known asset. The method 800 expands upon the details of step 706 in FIG. 7. In some implementations, the method 800 may be performed by the system 100 in FIG. 1C, and thus will be described with reference to such for clarity. Referring to FIGS. 1C, 7 and 8, at 704, the user credentials are received and successfully verified and an image is received from the user at, for example, the user application 126.

At 802, a key is identified based on the received image. The key can be a unique identifier associated with the received image. For example, in some implementations, the key can be a perceptual hash value or a hash string associated with the received image. In other implementations, the key can be a barcode or an identification token associated with the received image. The key of the received image can be identified and/or generated by, for example, the user application 126 and/or the application module 168.

At 804, an analysis step is performed to determine if the identified key of the received image maps to a known and stored asset associated with the user account. The user account is the account associated with the user whose credentials have been successfully verified, at 704. In some implementations, the perceptual hash value or hash string of the received image can be compared to stored hash values of known assets stored in a hash table that is associated with the user account by, for example, the application module 168.

If it is determined that the identified key of the received image does not map to a known and stored asset associated with the user account, an output error message can be displayed to the user (e.g., error_msg="received image is not a valid asset"), at 806. In some implementations, the application module 168 can send a signal to the user application 126 via the network 110 to display an error message on the GUI of the user application 126.

If it is determined that the identified key of the received image successfully map to a known and stored asset associated with the user account, critical information associated with the asset such as, for example, the stored supplemental content can be retrieved by, for example, the application module 168, at 808. As described above, the supplemental content can be, for example, a slideshow of images files that is associated with a significant event in the user's life, or a video file that is associated with a significant event in the user's life, or a map file with a set of geographical co-ordinates on a map file that can indicate a location that is associated with a significant event in the user's life.

Figure 9:
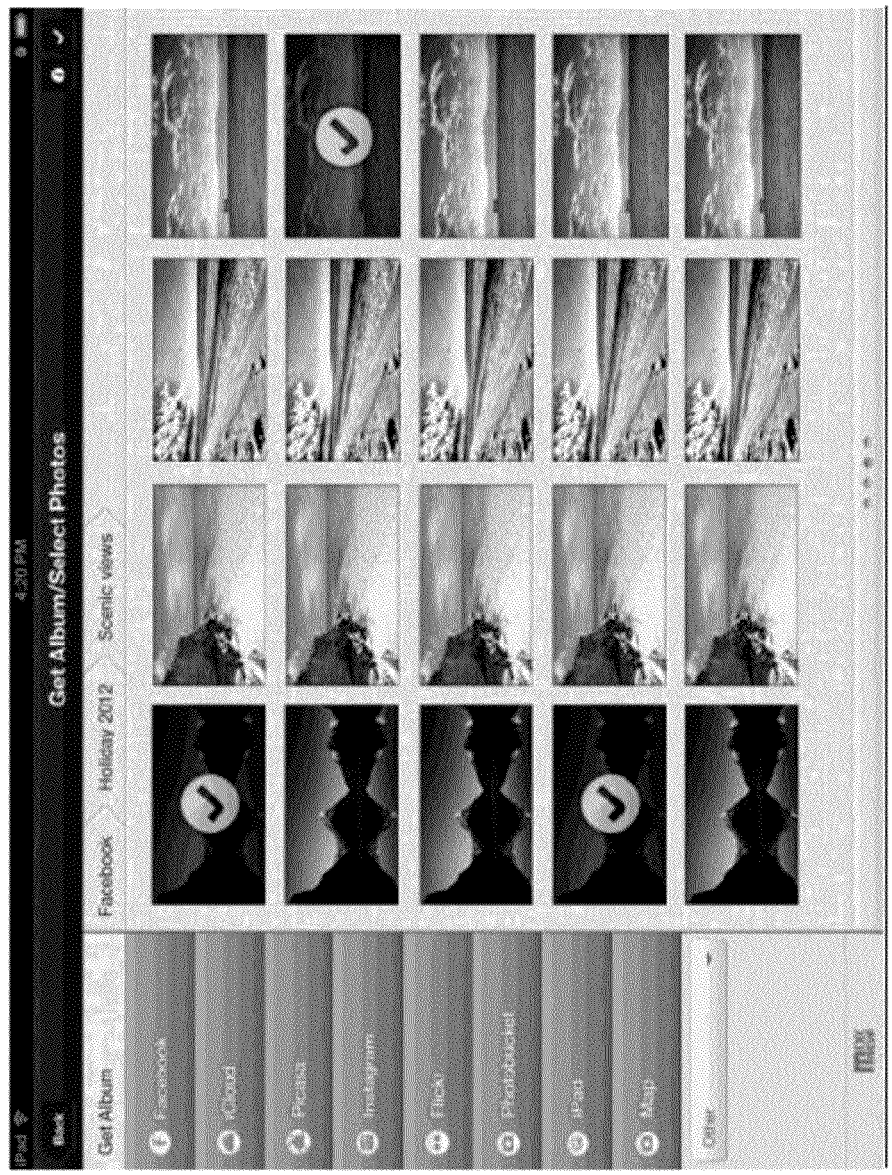
FIG. 9 is an illustration of an image selection screen for the augmented reality system.

FIG. 9 is an illustration of an image selection screen for the augmented reality system. The image selection screen 900 can be displayed in, for example, the GUI of the user application 126 and can allow the user to select an image (e.g., an image file(s), a video file, or a map file) from a local storage associated with the user device 120 (e.g., a hard disk), a cloud storage, or a third party service (e.g., Facebook, Instagram, Google+, Picasa, etc.) for input into the user application or for selection of an asset. In the example of FIG. 9, the image selection screen 900 allows the user to select a photoproduct (e.g., a photo album) from Facebook, where the photo album selected is titled as "Holiday 2012". The user further selects a set of images classified under the group "Scenic views" within the photo album "Holiday 2012", where the three particular images selected are represented by the "tick" mark.

Figure 10A:
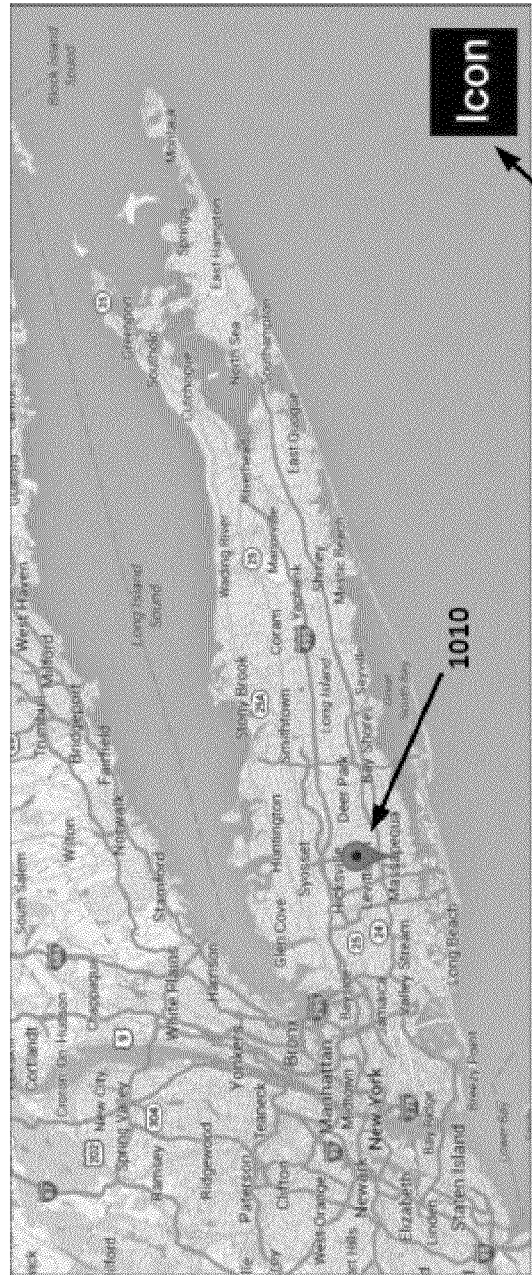
FIG. 10A is an illustration of a map image with a superimposed icon in the lower right corner of the map image.

FIG. 10A is an illustration of a map image with a superimposed icon in the lower right corner of the map image. The map image 1000 with the icon 1005 can be generated by the user application 126 and/or the application module 168 in step 408 of the method 400 for processing an asset that is identified to be a map file as described above in relation to FIG. 4. Activation of the icon 1005 in the map image by, for example, clicking on the icon 1005 can generate a pointer or a beacon 1010 at a location in the map image that is associated with a significant event in the life of the user. In some implementations, the actual GPS co-ordinates of the selected geographical location can also be displayed at an insert window in the map image 1000.

Figure 10B:
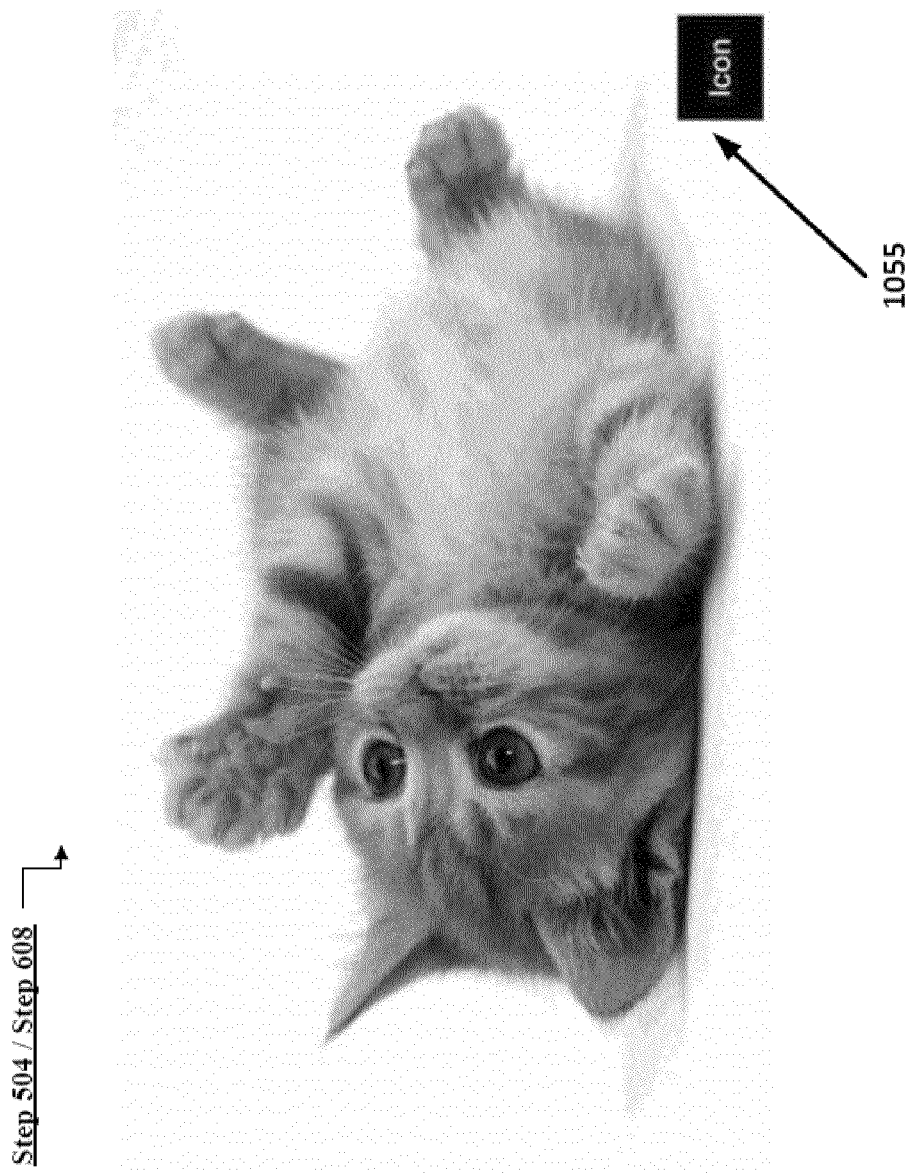
FIG. 10B is an illustration of a digital image with a superimposed icon in the lower right corner of the digital image.

FIG. 10B is an illustration of a digital image with a superimposed icon in the lower right corner of the digital image. The digital image 1050 with the icon 1055 can be generated by the user application 126 and/or the application module 168 in step 504 of the method 500 for processing an asset that is identified to be a video file as described above in relation to FIG. 5 and in step 608 in the method 600 for processing an asset that is identified to be an image file as described above in relation to FIG. 6. In some implementations, activation of the icon 1055 in the digital image 105 by, for example, clicking on the icon 1055 can play a video file that is linked to the digital image 1050 and that is associated with a significant event in the user's life. In other implementations, activation of the icon 1055 in the digital image 105 by, for example, clicking on the icon 1055 can display a slideshow of a set of images linked to the digital image 1050 that is associated with a significant event in the user's life.

As described above, the present specification includes methods for automatically capturing augmented reality images from a user's interactive content from a smart phone, tablet, computer, or similar communication device. In some implementations, the method selects a frame or several frames from a video file, identifies and validates the quality of the image in the selected frame, and associates the selected image to the video file. In such implementations, when the selected image is viewed via a camera or optical device, the associated video can be played. Alternatively, in other implementations, the method selects an image from a set of images in a slideshow, identifies and validates the quality of the selected image, and associates the selected image to the slideshow. In such implementations, when the selected image is viewed via a camera or optical device, the associated slideshow can be played. In yet other implementations, the method can select a user's geographic location coordinates and transpose the selected user's location coordinates into a map file. In such implementations, when the selected map file is viewed via a camera or optical device, the associated location coordinates can be viewed with a pointer in the map file.

In some implementations, an augmented reality system can combine photos, maps and videos to allow users to create a cohesive interactive story. Photoproducts, by their nature, are useful for creating permanent visual chronicles of life events and experiences and the augmented reality system described herein can allow consumers to bring these events to life. After the product is created using the augmented reality system, a user can receive a physical product where the video or map can be accessed through an augmented reality viewer via a camera-enabled communication device (e.g., smart phone), or optical computing device (e.g., Google Glass).

In some implementations, a computer-implemented method can generate a physical document having at least one image, where the image can provide access to digital media content (e.g., video, audio and/or digital images). In such implementations, the computer-implemented method includes receiving, at one or more processors, a digital media file and obtaining, at the one or more processors, a digital image. The computer-implemented method also includes receiving, at the one or more processors, a request to link the digital image to the digital media file and processing, at the one or more processors, the digital image to generate a score, where the score is based at least in part on a uniqueness of the digital image. The computer-implemented method also includes associating, at the one or more processors, the digital image to the digital media file such that a representation of the digital image provides access to the digital media file in response to determining that the score for the digital image satisfies a threshold. The computer-implemented method further includes generating data representing a physical document, where the physical document includes a representation of the digital image, and providing the data representing the physical document to a publisher, such that the publisher prints one or more copies of the physical document.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method of generating a physical document having at least one image providing access to digital media content, the method comprising:
receiving, at one or more processors, a digital media file;
obtaining, at the one or more processors, a digital image;
generating, at the one or more processors, a graphical representation that includes a link from the digital image to the digital media file, the digital media file being accessible upon activation of the link and including an image other than the digital image;
processing, at the one or more processors, the digital image to generate a score, the score being based at least in part on a uniqueness of the digital image;
responsive to determining that the score for the digital image satisfies a threshold, associating, at the one or more processors, the digital image to the digital media file such that the link provides access to the digital media file;

generating data representing a physical document, the physical document including the link and a representation of the digital image, and not including the digital media file; and providing the data representing the physical document to a publisher, such that the publisher prints one or more copies of the physical document, wherein processing, at the one or more processors, the digital image to generate the score comprises:
- obtaining print specifications of the physical document;
- comparing one or more dimensions of the digital image with one or more dimensions of the print specifications of the physical document to determine a specification score;
- comparing a hash value associated with the digital image to a hash value associated with a reference image to determine a hamming distance;
- determining a hash score based on whether the hamming distance satisfies a hamming threshold;
- generating a quality score based on whether one or more quality parameters of the digital image satisfies a quality criterion; and
- generating the score for the digital image based on at least one of the specification score, the hash score, and the quality score.

2. The computer-implemented method of claim 1, further comprising:
   receiving, at one or more processors, data corresponding to the link scanned from the physical document, and
   responsive to receiving the data corresponding to the link, transmitting the digital media file.

3. The computer-implemented method of claim 1, wherein obtaining the digital image comprises generating an image from a video file.

4. The computer-implemented method of claim 1, wherein scoring the digital image comprises determining the score for the digital image using at least one of an image resolution test, an image uniqueness test, and an image quality test.

5. The computer-implemented method of claim 1, wherein the image uniqueness test of the digital image comprises a measure of image uniqueness based on a perceptual hash of the digital image.

6. The computer-implemented method of claim 1, further comprising:
   obtaining user credentials;
   verifying the user credentials for authorization; and
   responsive to the user credentials being authorized, granting access control to the digital media file.

7. The computer-implemented method of claim 1, further comprising:
   receiving, at one or more processors, a subsequent digital media file;
   obtaining, at the one or more processors, a subsequent digital image;
   generating, at the one or more processors, a second graphical representation that includes a second link from the subsequent digital image to the subsequent digital media file, the subsequent digital media file being accessible upon activation of the second link and including an image other than the subsequent digital image;
   processing, at the one or more processors, the subsequent digital image to generate a second score, the second score being based at least in part on a uniqueness of the subsequent digital image;
   responsive to determining that the second score for the subsequent digital image satisfies a threshold, associating, at the one or more processors, the subsequent digital image to the subsequent digital media file such that the second link provides access to the subsequent digital media file.

8. The computer-implemented method of claim 1, wherein obtaining the digital image comprises:
   receiving a map file;
   identifying location information associated with the map file; and
   generating an image of the map file with the location information.

9. A non-transitory computer-readable storage medium comprising instructions, which, when executed by one or more computers, cause the one or more computers to perform actions comprising:
   receiving a digital media file;
   obtaining a digital image;
   generating a graphical representation that includes a link from the digital image to the digital media file, the digital media file being accessible upon activation of the link and including an image other than the digital image;
   processing the digital image to generate a score, the score being based at least in part on a uniqueness of the digital image;
   responsive to determining that the score for the digital image satisfies a threshold, associating the digital image to the digital media file such that the link provides access to the digital media file;
   generating data representing a physical document, the physical document including the link and a representation of the digital image, and not including the digital media file; and
   providing the data representing the physical document to a publisher, such that the publisher prints one or more copies of the physical document,
   wherein processing the digital image to generate the score comprises:
   - obtaining print specifications of the physical document;
   - comparing one or more dimensions of the digital image with one or more dimensions of the print specifications of the physical document to determine a specification score;
   - comparing a hash value associated with the digital image to a hash value associated with a reference image to determine a hamming distance;
   - determining a hash score based on whether the hamming distance satisfies a hamming threshold;
   - generating a quality score based on whether one or more quality parameters of the digital image satisfies a quality criterion; and
   - generating the score for the digital image based on at least one of the specification score, the hash score, and the quality score.

10. The non-transitory computer-readable storage medium of claim 9, wherein the actions further comprise:
    receiving data corresponding to the link scanned from the physical document, and
    responsive to receiving the data corresponding to the link, transmitting the digital media file.

11. The non-transitory computer-readable storage medium of claim 9, wherein:
    obtaining the digital image comprises generating an image from a video file;
    scoring the digital image comprises determining the score for the digital image using at least one of an image resolution test, an image uniqueness test, and an image quality test; and the image uniqueness test of the digital image comprises a measure of image uniqueness based on a perceptual hash of the digital image.

12. The non-transitory computer-readable storage medium of claim 9, wherein the actions further comprise:
obtaining user credentials;
verifying the user credentials for authorization; and
responsive to the user credentials being authorized, granting access control to the digital media file.

13. The non-transitory computer-readable storage medium of claim 9, wherein the actions further comprise:
receiving a subsequent digital media file;
obtaining a subsequent digital image;
generating a second graphical representation that includes a second link from the subsequent digital image to the subsequent digital media file, the subsequent digital media file being accessible upon activation of the second link and including an image other than the subsequent digital image;
processing the subsequent digital image to generate a second score, the second score being based at least in part on a uniqueness of the subsequent digital image; and
responsive to determining that the second score for the subsequent digital image satisfies a threshold, associating, at the one or more processors, the subsequent digital image to the subsequent digital media file such that the second link provides access to the subsequent digital media file.

14. A system comprising:
one or more computers and one or more storage devices storing instructions that are operable and when executed by one or more computers, cause the one or more computers to perform actions comprising:
receiving a digital media file;
obtaining a digital image;
generating a graphical representation that includes a link from the digital image to the digital media file, the digital media file being accessible upon activation of the link and including an image other than the digital image;
processing the digital image to generate a score, the score being based at least in part on a uniqueness of the digital image;
responsive to determining that the score for the digital image satisfies a threshold, associating the digital image to the digital media file such that the link provides access to the digital media file;
generating data representing a physical document, the physical document including the link and a representation of the digital image, and not including the digital media file; and
providing the data representing the physical document to a publisher, such that the publisher prints one or more copies of the physical document,
wherein processing the digital image to generate the score comprises:
obtaining print specifications of the physical document, comparing one or more dimensions of the digital image with one or more dimensions of the print specifications of the physical document to determine a specification score;
comparing a hash value associated with the digital image to a hash value associated with a reference image to determine a hamming distance;
determining a hash score based on whether the hamming distance satisfies a hamming threshold;
generating a quality score based on whether one or more quality parameters of the digital image satisfies a quality criterion; and
generating the score for the digital image based on at least one of the specification score, the hash score, and the quality score.

15. The system of claim 14, wherein the actions further comprise:
receiving data corresponding to the link scanned from the physical document, and
responsive to receiving the data corresponding to the link, transmitting the digital media file.

16. The system of claim 14, wherein:
obtaining the digital image comprises generating an image from a video file;
scoring the digital image comprises determining the score for the digital image using at least one of an image resolution test, an image uniqueness test, and an image quality test; and
the image uniqueness test of the digital image comprises a measure of image uniqueness based on a perceptual hash of the digital image.

17. The system of claim 14, wherein the actions further comprise:
obtaining user credentials;
verifying the user credentials for authorization; and
responsive to the user credentials being authorized, granting access control to the digital media file.

18. The system of claim 14, wherein the actions further comprise:
receiving a subsequent digital media file;
obtaining a subsequent digital image;
generating a second graphical representation that includes a second link from the subsequent digital image to the subsequent digital media file, the subsequent digital media file being accessible upon activation of the second link and including an image other than the subsequent digital image;
processing the subsequent digital image to generate a second score, the second score being based at least in part on a uniqueness of the subsequent digital image; and
responsive to determining that the second score for the subsequent digital image satisfies a threshold, associating, at the one or more processors, the subsequent digital image to the subsequent digital media file such that the second link provides access to the subsequent digital media file.

19. The system of claim 14, wherein obtaining the digital image comprises:
receiving a map file;
identifying location information associated with the map file; and
generating an image of the map file with the location information.

* * * * *